Patented Dec. 25, 1928.

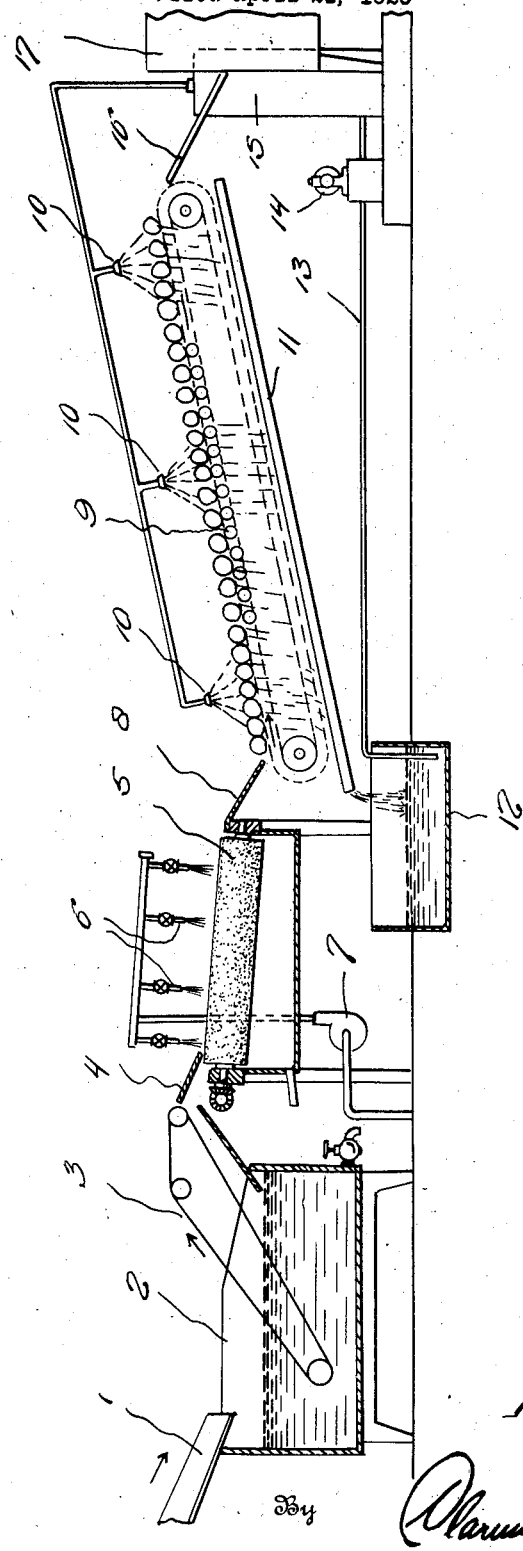

1,696,703

UNITED STATES PATENT OFFICE.

HENRY GRADY ZELLNER, OF FORT MYERS, FLORIDA, ASSIGNOR TO ZELTROCIDE CHEMICAL CORPORATION, OF LAKELAND, FLORIDA, A CORPORATION OF FLORIDA.

COMPOSITION FOR TREATING FRUIT.

Application filed April 21, 1925. Serial No. 24,829.

This invention relates to a process and composition for the treating of fresh fruit, during the preparation of the same for the market, which will allay or prevent the destructive decay resulting particularly from blue mold, green mold, stem end rot and anthracnose.

In the citrus fruit industry the fruit is clipped from the trees with a portion of the stem remaining thereon and before shipping is subjected to a washing, scrubbing, drying, and polishing treatment to clean and polish the fruit, in preparation for the market; following which the fruit is graded before packing for shipment. In the picking and handling of the fruit, a substantial amount becomes scratched, pricked, scarred, or the skin otherwise fractured or broken, which in some cases, is very minute, but sufficient to permit the attack and destruction of the fruit due to the action of blue mold, green mold, stem end rot, anthracnose and other diseases. During the washing process for cleaning the fruit, it will be seen that infected fruit will infect the wash water and that substantially all of the fruit passing through the wash water will become infected with these diseases, which will cause the decay of the fruit in a very short period of time, and which is the result of large losses on the part of shippers of citrus fruit, under present conditions.

The present invention is designed to allay or prevent the destructive action set up by the inoculation of the fruit, in the cleaning and scrubbing operation, by providing an aditional treatment of the fruit after leaving the scrubbing machine, with a solution having the property for allaying or preventing the destructive action of blue mold, green mold, stem end rot and anthracnose, as well as other diseases which cause decay. The fruit is then passed to the drier through the remaining treatment process to complete preparation for shipment in the usual manner.

The drawing accompanying this application, and forming a part thereof illustrates diagrammatically a portion of the apparatus for treating the fruit in the usual manner for preparation prior to shipment and illustrates particularly the arrangement of the machine used for applying the treating solution of this invention.

The fruit coming from the orchard or grove after being clipped is delivered to the chute 1, from which it is discharged into the washing tank 2, which ordinarily contains a soapy washing solution for loosening dirt and other foreign matter on the surface of the fruit from the skin thereof, which solution and manner of washing is well known in the art. A suitable form of conveyor 3, conveys the fruit from the soaking or washing tank 2, from which it is delivered onto the chute 4, to be transferred to the scrubbing rolls 5, where the fruit is scrubbed and sprayed with fresh water for thoroughly cleansing the same through the said nozzle 6, supplied with a continuous flow of fresh water from a suitable source by the pump 7. The thoroughly cleansed and washed fruit is then passed to the chute board 8 and onto the roller conveyor 9 of the special treatment apparatus where the sprays 10 thoroughly spray the entire surface of the fruit passing over the conveyor 9 with a solution adapted to allay or prevent the attack of the fruit by certain destructive diseases above mentioned. The conveyor used is of a type adapted to roll the fruit in such a manner that the entire surface of all of the fruit is directly sprayed. A drip pan 11 receives the drippings from the sprays 10 and the fruit as it passes over the conveyor 9 and conducts the same into the tank 12. The solution is again used by circulation through the pipe 13, by the pump 14 which maintains a pressure on the fluid within the flow tank 15, for supplying the spray nozzles 10 with a continuous supply of fluid. Upon leaving the conveyor 9 of the special treatment apparatus as above described, the chute 16 delivers the fruit to the drier 17, from which the fruit is treated in the usual and well-known manner by drying, polishing, grading, and packing, for shipment to points of distribution to the consumers.

Some packing houses are equipped with machinery for treating the fruit in successive baths such as in the tank 2, and in which cases, one of the treatment tanks would be supplied with the special treating solution of this invention and the fruit subjected to the bath in the solution instead of the spray.

After long and careful experiments, with numerous substances and compositions, it has been found that the following composition in the proportions stated, is best suited for the treatment of the fruit:

| | Pounds. |
|---|---|
| Borax | 100 |
| Sodium bicarbonate | 20 |
| Potassium permanganate | 2 |

These ingredients are thoroughly mixed following which the mixture is dissolved in water to prepare a solution of from 2 to 12% strength. It has been found, however, that a solution of approximately 6% strength is best suited for the fruit treatment.

It has been found by experiments that the use of borax alone will allay and partially prevent the attack of blue mold and reduce the destructive action thereof about 82%. Borax will not, however, affect to any appreciable extent or degree the attack and decay of green mold, stem end rot or anthracnose. The use of borax also leaves an undesirable white powdery deposit on the surface of the fruit which it is necessary to clean off before it is in condition for shipment and marketing and forms a disadvantageous feature of the use of borax alone, in order to make a highly marketable product, which will command a good price on the market.

It has been further found, by actual experiment that the addition of the sodium bicarbonate, and potassium permanganate eliminates the formation of any deposit on the surface of the fruit after treatment, and that the solution thoroughly impregnates the pores of the skin and any cuts, bruises, scratches, or other fractures in the fruit. It is also found that the mixture will effectively allay and prevent the destructive action and attack of blue mold, green mold, stem end rot, anthracnose and other diseases. Continued and thorough practical application and experiments have proven that the destructive action is reduced or allayed, by this use of the above mentioned solution, practically 99%, particularly in the case of all of the diseases above mentioned.

It is an important features of this invention in addition to eliminating the destructive action of blue mold, green mold, stem end rot, and anthracnose, that the fruit after being treated and dried, and ready for the market is free from all deposits which might result from the treating solution. In this way, a clear, clean and yet thoroughly treated product is produced, which will be well preserved for substantial lengths of time. A product is thus produced which will command the best market prices and wherein it has been found that losses during shipment will be reduced to less than 3% for periods up to ninety days. It is furthermore to be understood that while the specific proportions of the several elements of the composition as set forth above are preferable for use in making the solution for treating the fruit as above described, any compositions having characteristics similar to those above stated for producing the result herein set forth are clearly within the scope of this invention and form a part thereof.

What is claimed is:

The herein described composition to be prepared in solution for treating fresh fruit for market to prevent destructive decay resulting from blue mold, green mold, stem end rot, and anthracnose comprising a mixture of substantially one-hundred pounds of borax, substantially twenty pounds of sodium bicarbonate, and substantially two pounds of potassium permanganate.

In testimony whereof I affix my signature.

HENRY GRADY ZELLNER.